(12) United States Patent
Milks

(10) Patent No.: US 7,731,574 B2
(45) Date of Patent: Jun. 8, 2010

(54) MECHANISM FOR OPENING A VENT COVER

(75) Inventor: Stephen A. Milks, Lapeer, MI (US);
Penny Milks, legal representative, Lapeer, MI (US)

(73) Assignee: Fan-Tastic Vent, Imlay City, MI (US)

( * ) Notice: Subject to any disclaimer, the term of this patent is extended or adjusted under 35 U.S.C. 154(b) by 189 days.

(21) Appl. No.: 11/811,297

(22) Filed: Jun. 8, 2007

(65) Prior Publication Data
US 2008/0302019 A1 Dec. 11, 2008

(51) Int. Cl.
*B60H 1/26* (2006.01)
*B60H 1/24* (2006.01)
*F24F 7/007* (2006.01)
*B60J 10/12* (2006.01)

(52) U.S. Cl. ............... 454/94; 454/117; 454/129; 454/136; 454/349; 296/216.02; 49/342

(58) Field of Classification Search ............ 454/94, 454/117, 129, 136, 349; 296/216.02; 49/94, 49/342; 114/202
See application file for complete search history.

(56) References Cited

U.S. PATENT DOCUMENTS

| | | | |
|---|---|---|---|
| 301,899 A * | 7/1884 | Kaufman et al. ............ 49/342 |
| 1,631,309 A * | 6/1927 | Dietrichson ................ 454/89 |
| 2,372,164 A * | 3/1945 | Woodhams ................. 454/94 |
| 2,777,687 A * | 1/1957 | Jewett et al. ............... 49/324 |
| D180,783 S | 8/1957 | Helms et al. |
| 2,921,819 A * | 1/1960 | Ritkin ....................... 384/439 |
| 2,981,538 A * | 4/1961 | Bennett ...................... 49/82.1 |
| 3,030,145 A | 4/1962 | Kottemann |
| 3,144,574 A | 8/1964 | Henry-Baudot |
| 3,280,353 A | 10/1966 | Haydon et al. |
| 3,348,086 A | 10/1967 | Monma |
| 3,566,165 A | 2/1971 | Lohr |
| 3,733,150 A | 5/1973 | Porter et al. |
| 3,846,938 A * | 11/1974 | Kelly ...................... 49/342 |
| 3,860,404 A | 1/1975 | Jochimski |
| 3,861,083 A * | 1/1975 | Goiot ....................... 49/193 |

(Continued)

FOREIGN PATENT DOCUMENTS

FR 2681818 A1 * 4/1993

OTHER PUBLICATIONS

12V WindMachine provided by Jade Mountain found at http://www.jademountain.com/heatcool//windmaker.html, Jun. 2000.

(Continued)

*Primary Examiner*—Steven B McAllister
*Assistant Examiner*—Patrick F. O'Reilly, III
(74) *Attorney, Agent, or Firm*—Harness, Dickey & Pierce, P.L.C.

(57) ABSTRACT

A vent assembly has a base and a cover connected to the base. The cover moves between a closed and open position. A fan is optionally mounted for rotation in the base. A mechanism, including a strut system, raises and lowers the cover. The strut system is connected with the cover at two positions spaced from one another. When the cover is in its closed position, a retention force is provided by the strut system and is distributed about the cover.

14 Claims, 4 Drawing Sheets

U.S. PATENT DOCUMENTS

| | | | |
|---|---|---|---|
| 3,879,623 A | | 4/1975 | Miyake |
| 3,890,963 A | | 6/1975 | Patterson |
| 3,979,148 A | * | 9/1976 | Martin ................ 296/215 |
| 4,038,911 A | * | 8/1977 | Hart ..................... 454/94 |
| 4,141,320 A | | 2/1979 | Hatfield |
| 4,193,339 A | * | 3/1980 | Giles .................. 454/136 |
| 4,303,844 A | | 12/1981 | Suzuki |
| 4,415,197 A | * | 11/1983 | Meyer ............. 296/216.02 |
| 4,615,263 A | * | 10/1986 | Titterud ................ 454/94 |
| 4,633,769 A | | 1/1987 | Milks |
| 4,684,839 A | | 8/1987 | Fujisaki et al. |
| 4,845,905 A | * | 7/1989 | Frank .................... 52/72 |
| 5,054,377 A | * | 10/1991 | Mochel et al. ......... 454/136 |
| 5,099,181 A | | 3/1992 | Canon |
| 5,109,171 A | | 4/1992 | Schmider |
| 5,110,263 A | | 5/1992 | Chiu |
| 5,148,895 A | | 9/1992 | Kakizaki |
| 5,232,090 A | | 8/1993 | Raab et al. |
| 5,270,596 A | | 12/1993 | Shibuya et al. |
| 5,568,702 A | * | 10/1996 | Frank et al. ............ 49/153 |
| 5,660,367 A | | 8/1997 | Rush |
| 5,725,356 A | | 3/1998 | Carter |
| 5,839,205 A | | 11/1998 | Hung |
| 5,929,544 A | | 7/1999 | Maekawa et al. |
| 6,168,517 B1 | | 1/2001 | Cook |
| 6,309,192 B1 | | 10/2001 | Litvin |
| 6,440,190 B1 | | 8/2002 | Goyetche |
| 7,004,832 B2 | | 2/2006 | Thomas |

OTHER PUBLICATIONS

12-Volt Fans provided by Chagnon's Outdoor World found at http://www.outdoor-catalog.com/power/air_fans.htm, Sep. 2001.

12-Volt Brushless Fan provided by Kollmann Marine, Inc. found at http://www.kollmann-marine.com/fans.html, Sep. 2001.

Oscillating 12 Volt Mini-Fan provided by Solar Generators found at http://www.solargenerators.com/fans.htm, Sep. 2001.

Ultra-Thin Line 12-Volt Electric Fans provided by Fluidyne Racing Products found at http://fluidyne.com/fans.html, Sep. 2001.

"Fan-Tastic Vent Model 4000R brochure", www.fantasticvent.com.

"Fan-Tastic Vent" printout of website, www.fantasticvent.com.

* cited by examiner

MECHANISM FOR OPENING A VENT COVER

FIELD

The present disclosure relates to vent assemblies and, more particularly, to a mechanism for raising and lowering the top cover.

BACKGROUND

In motor vehicles, such as motor coaches, that include a living area, it is desirable to have a vent assembly that enables the interior of the coach to vent to the outside. Ordinarily, a vent assembly is utilized that is capable of moving air either into or out of the interior of the motor coach. One such fan assembly is illustrated in U.S. Pat. No. 4,633,769 entitled "Roof Vent Fan Assembly".

When the motor coach is being driven, it is desirable to have the cover in a down position. However, it is also possible that the cover may be raised to enable the interior to vent. The above vent assembly includes an arm to raise and lower the cover between an open and closed position. The arm is directly connected to a bracket that is coupled with the cover.

The disclosure provides a strut system that connects with an arm and with the cover. The strut system provides two connecting positions to retain the cover onto the base. The system provides an over center retention force to maintain the cover on the base.

SUMMARY

According to a first aspect of the disclosure, a vent assembly comprises a base that is secured in an opening in a vehicle. A cover is connected with the base. The cover is movable between an open and a closed position. Optionally, a fan is mounted for rotation within an opening in the base. A mechanism raises and lowers the cover between the open and closed position. The mechanism includes a strut system connected to the cover at two positions that are spaced from one another. When the cover is in a closed position, a force is provided by the strut system which is distributed about the cover to maintain the cover on the base. The cover includes a hinge on one side of the base. The two connections are positioned on the cover spaced away from the hinge side and on opposite sides of the fan. The strut system includes a U-shape strut coupled with a pair of brackets mounted on the cover to assist in raising and lowering the cover. The cover has a rectangular configuration with the hinge along one side and the two connection positions along the two sides perpendicular to the hinge side, both positions extending towards the opposite parallel side. The mechanism includes an arm connected with the U-shaped strut. The arm includes a pronged receptacle to receive a leg of the U-shaped strut. A pair of bearing blocks are positioned on the base to receive a web of the U-shaped strut. The bearing blocks position the U-shaped strut on the base. The connecting positions extend beyond a mid-line of the cover away from the hinged side to provide an over center force to retain the cover in the closed position.

According to a second aspect of the invention, a mechanism to raise and lower a cover of a vent assembly comprises an arm and a strut. The strut is connected with the cover at two positions that are spaced from one another. When the cover is in its closed position, a retention force is provided by the strut and distributed about the cover. The strut system includes a U-shaped strut to be coupled with a pair of brackets mounted on the cover. The arm includes a pronged receptacle to receive a leg of the U-shaped strut. Also, a pair of bearing blocks receive a web of the U-shaped strut to position the strut onto a base of the fan assembly.

According to a third aspect of the invention, a vent assembly comprises a base to be secured to an opening in a vehicle. A cover is hinged to the base. The cover has a rectangular configuration and is movable between an open and a closed position. A fan is optionally mounted for rotation in an opening in the base. A mechanism to raise and lower the cover between the open and closed position includes an arm associated with the base. The arm is coupled with a crank to initiate movement of the arm to raise and lower the arm. A strut is connected with the arm and with the cover. The strut is connected to the cover at two positions spaced from one another. When the cover is in a closed position, a retention force is provided by the strut and is distributed about the cover to retain the cover in a down position. The arm has an overall J-shape with a strut coupling mechanism at one end and a plurality of teeth at the other. The teeth are coupled with a screw mechanism of the crank to raise and lower the arm. The strut has an overall U-shape and is coupled with a pair of brackets mounted on the cover. The arm includes a pronged receptacle to receive a leg of the U-shaped strut. A pair of bearing blocks are positioned on the base to receive a web of the U-shaped strut to position the strut onto the base.

Further areas of applicability will become apparent from the provided description. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
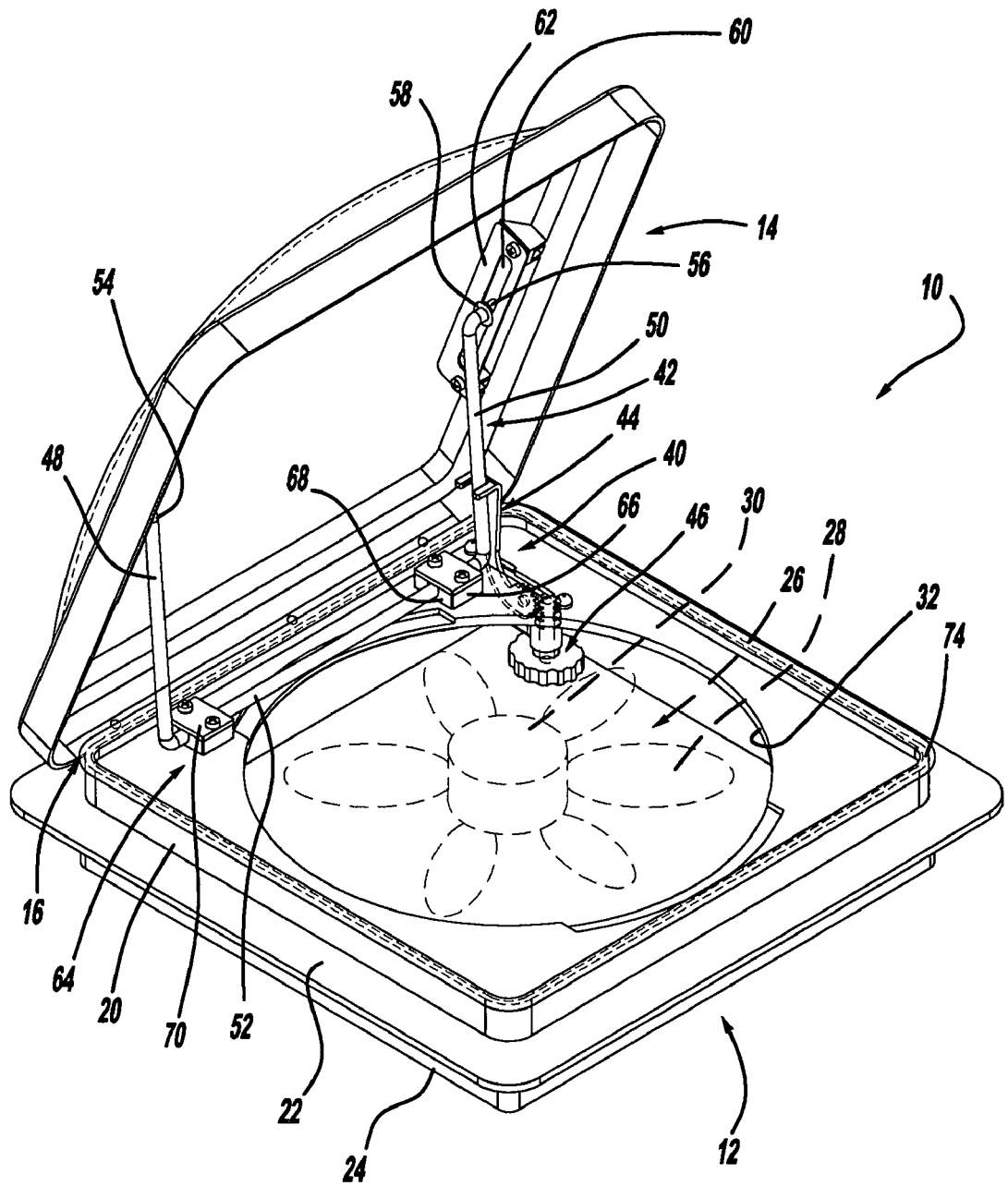
FIG. 1 is a perspective view of a vent assembly with the cover in an open position.

The following description is merely exemplary in nature and is not intended to limit the present disclosure, application, or uses.

Turning to the figures, a vent assembly is illustrated and designated with the reference numeral 10. The vent assembly 10 includes a base 12 and a cover 14. A hinge 16 pivotally couples the cover 14 with the base 12. Thus, the hinge 16 is secured to the cover 14 and either the base upper portion 20 or the deck 22 of the base 12. The base 12 includes a lower portion 24 which is positioned through an aperture in a vehicle.

An optional fan assembly 26, including a blade 28 and a motor 30, is positioned in an opening 32 in the upper portion 20 of the base 12. When the fan assembly is not included, the vent assembly is a static vent. The fan blade 28 rotates in the opening 32 to withdraw air out of or to deliver air into the interior of the vehicle.

Figure 4:
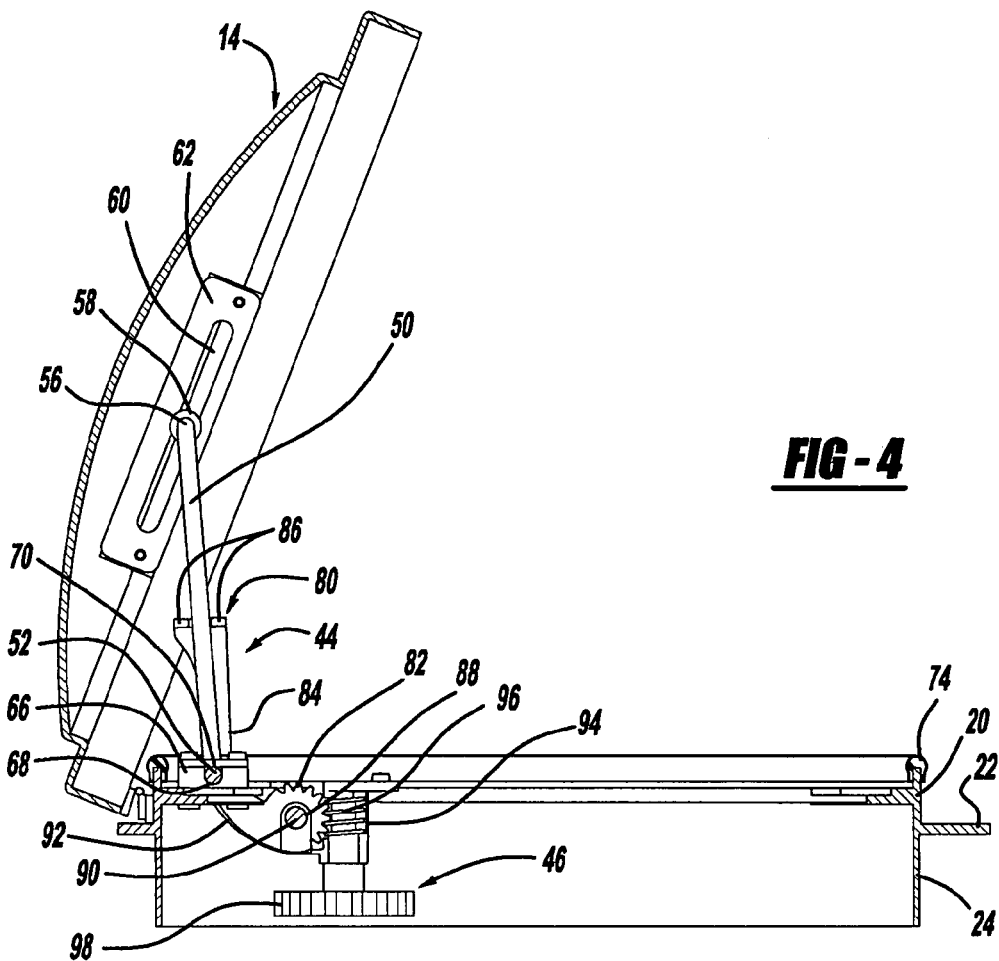
FIG. 4 is a cross section view of the vent assembly in the open position.

A mechanism 40 is positioned on the base 12 to raise and lower the cover 14 from the base 12. The raising and lowering mechanism 40 includes a strut 42, arm 44 and crank 46. The strut 42 has an overall U-shape as illustrated in FIG. 1. The strut 42 includes a pair of legs 48 and 50 as well as a web 52. Each leg includes an end 54 and 56 which projects parallel to the web 52. The ends 54 and 56 include bushings 58 that ride in slots 60 of brackets 62. The brackets 62 are secured to the cover 14 via fasteners. The web 52 of the strut 42 is secured into bearing blocks 64. The bearing blocks 64 include a base 66 secured onto or integrally formed with the top portion 20 of the base 12. The bearing block bases 66 include a channel 68 to receive the web 52 of the U-shaped strut 42, as seen in FIGS. 1 and 4. Also, covers 70 are positioned over the web 52 to secure the web 52 in the bearing block bases 66 onto the base 12. Fasteners secure the covers 70 with their respective base 66.

Figure 2:
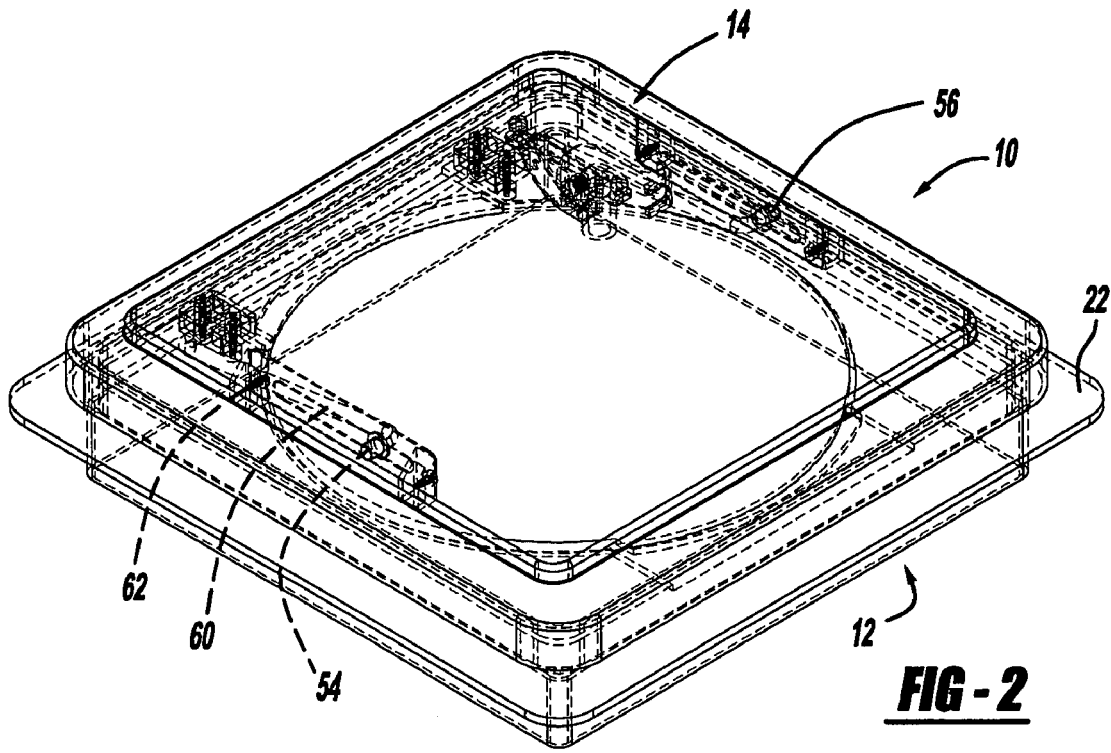
FIG. 2 is a view like FIG. 1 with the cover in a closed position.
Figure 3:
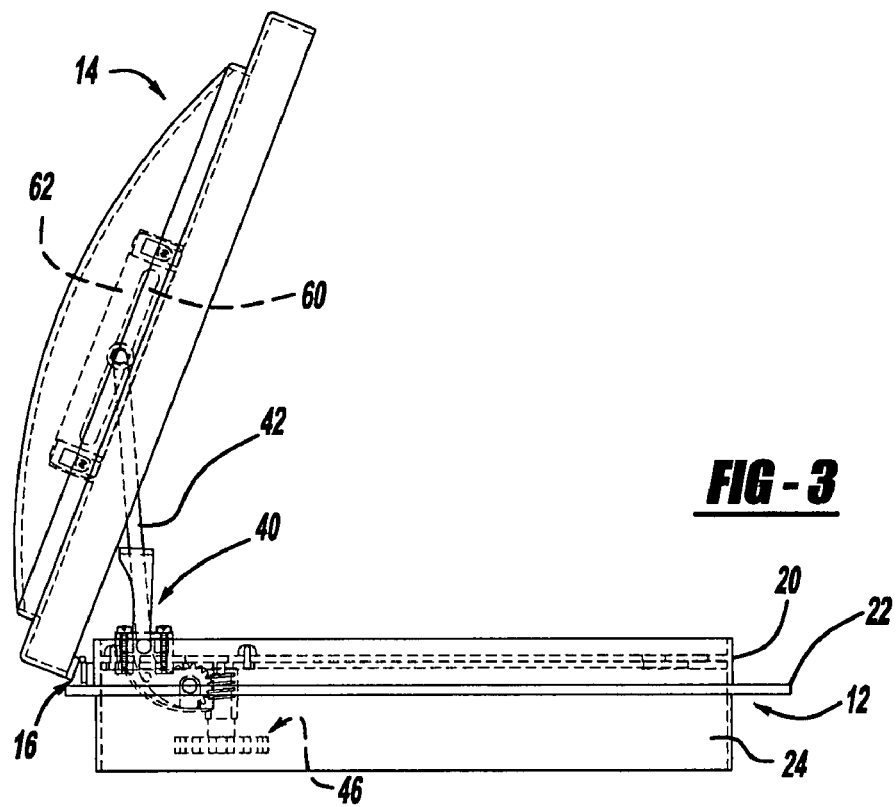
FIG. 3 is a side elevation view of the vent assembly in FIG. 1.
Figure 5:
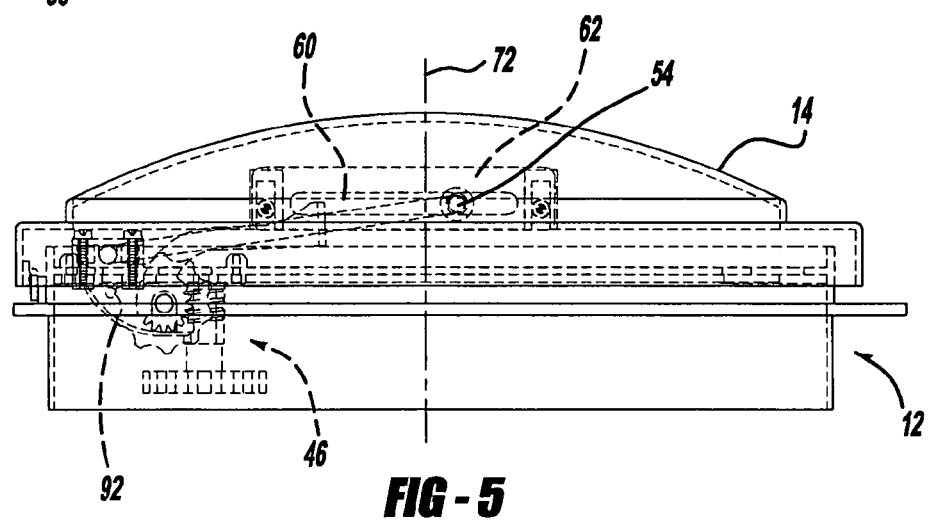
FIG. 5 is a side elevation view like FIG. 3 with the cover in a closed position.
Figure 6:
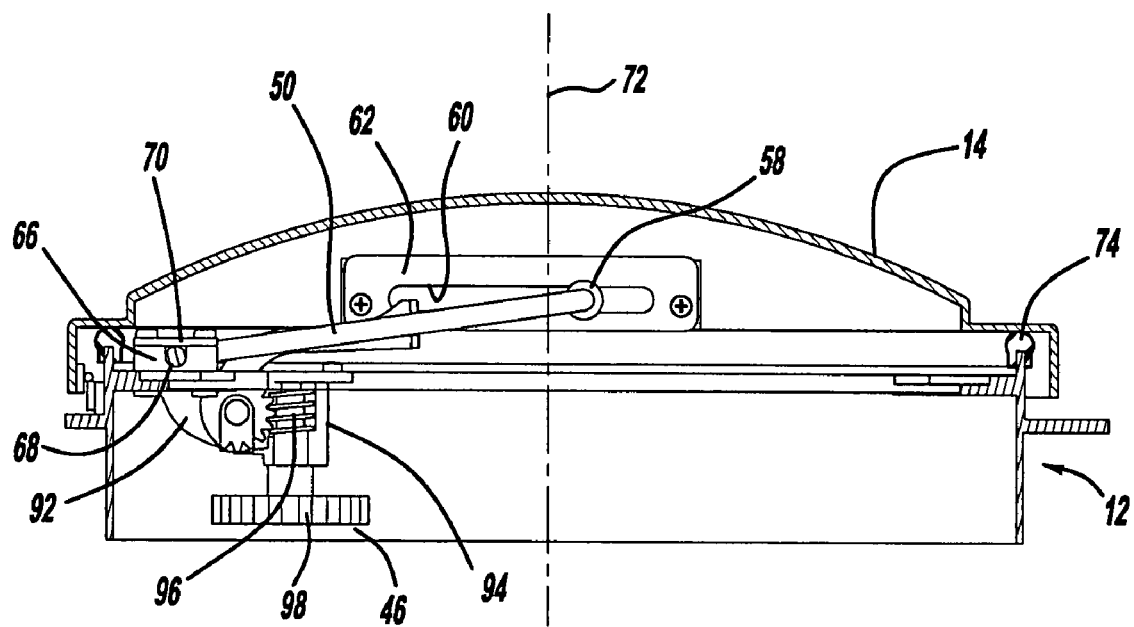
FIG. 6 is a cross section view of the vent assembly in the closed position.

Accordingly, the U-shaped strut provides a connection at two positions on the cover 14. When the cover 14 is in its closed position as illustrated in FIGS. 2, 5 and 6, the ends 54, 56 of the U-shaped strut 42 extend beyond the mid point 72 of the fan base 12. Also, the ends 54, 56 of the struts 42 are spaced from the hinge 16 towards the side of the rectangular cover 14 opposing the hinge 16. Thus, the strut 42 applies a retention force to maintain the cover onto the base 12. Ordinarily, a seal 74 is positioned about the periphery of the upper portion 20 so that when the cover 14 is in its down position, the seal is contacted by the cover 14 as seen in FIG. 6. This compresses the seal 74 to provide sealing of the cover 14 with the base 12. By having the two point system, the force to retain the cover on the base 12 is distributed substantially equally on both sides of the cover 14.

The arm 44 has an overall J-shape with a strut receiving receptacle 80 at one end and a plurality of teeth 82 at the other. The J-shaped body 84 of the arm is essentially a flat planar member. The teeth 82 are in the plane with the body 84. The strut receiving receptacle 80 projects perpendicular to the body 84. The receptacle 80 includes a pair of prongs 86 which receive the rod-shaped strut leg 50 of the strut 42.

The tooth end of the arm body 84 includes an aperture 88 which receives a pin 90 to fix the arm 44 within the housing 92. The housing 92 is opened at the top and includes a cylindrical portion 94 which receives a screw member 96 of the crank 46. A handle 98 is secured to one end of the screw member 96 to enable rotation of the screw in the housing 92.

The mechanism 40 lifts and lowers the cover 14 as follows. The handle 98 is rotated which, in turn, rotates the screw 96. The screw 96, in meshing contact with the teeth 82, moves the cover 14 between positions. As the screw 96 rotates, the teeth 82, move one direction or the other to open or close the cover 14. As the teeth 82 are moved one way or the other, the body 84 pivots about the pin 90. As this occurs, the arm receptacle 80 is moved up or down which, in turn, moves the strut 42. As this occurs, the bushings 58 slide in the slots 60 of the brackets 62 which lift or lower the cover 14. When the cover 14 is brought into its closed position, as illustrated in FIGS. 5 and 6, the ends 54 and 56 of the strut 42 are past the center line 72 of the cover 14. This provides an over center mechanism to compress the seal 74 positioned on top of the base upper portion 20 to seal the cover 14 with the base 12. The U-shaped strut 42 provides a downward retention force on both sides of the fan via the brackets 62. This downward force provides a distributed force about the cover 14 to maintain the cover 14 in contact with the base 12 in a closed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vent assembly comprising:
    a base for securement into an opening;
    a cover connected with said base, said cover movable between a closed and an open position;
    a mechanism for raising and lowering said cover between said open and closed positions, said mechanism including a strut system connected with said cover at two positions spaced from one another such that when said cover is in said closed position, a retention force provided by said strut system is distributed about the cover, said strut system includes a U-shaped strut coupled with a pair of brackets mounted on said cover for raising and lowering said cover;
    a pair of bearing blocks on said base for receiving a connecting portion of said U-shape strut for positioning said U-shaped strut on said base; and
    wherein said mechanism includes an arm connected with said strut system, said arm being slidably coupled with a leg of said strut system and said leg being slidably coupled with said cover.

2. The vent assembly of claim 1, wherein said cover includes one side hinged with said base, and said two connection positions spaced away from said hinged side and on opposite sides of a fan.

3. The vent assembly of claim 1, wherein said cover has a rectangular configuration with said cover hinged along one side and said two connection positions along two perpendicular sides toward a side parallel to the hinged side.

4. The vent assembly of claim 1, wherein said arm includes a pronged receptacle for receiving said leg of said U-shaped strut.

5. The vent assembly of claim 1, wherein with the cover in a closed position, said two connecting positions are beyond a mid line of said cover spaced from a hinged side of said cover.

6. A mechanism for raising and lowering a cover of a vent assembly between an open and closed position comprising:
    a system including an arm and a strut coupled with the arm for lifting and lowering the strut, said strut connecting with the cover at two positions spaced from one another such that when the cover is in the closed position, a retention force provided by said system is distributed about the cover, said strut system is a U-shaped strut coupled with a pair of brackets to be mounted on said cover for raising and lowering said cover; and
    a pair of bearing blocks for attaching to a base of the vent assembly, said bearing blocks receiving a connecting portion of said U-shape strut for positioning said U-shaped strut on the base;
    wherein the arm is movable relative to the strut and the strut is movable relative to the cover; and
    wherein the cover includes a hinged side and said two positions at which the strut connects with the cover are disposed along two sides perpendicular to said hinged side.

7. The mechanism of claim 6, wherein said arm is connected with a leg of said U-shaped strut.

8. The mechanism of claim 7, wherein said arm includes a pronged receptacle for receiving the leg of said U-shaped strut.

9. A vent assembly comprising:
    a base for securement into an opening;

a cover connected with said base, said cover movable between a closed and an open position;

a fan mounted for rotation in said base;

a mechanism for raising and lowering said cover between said open and closed positions, said mechanism including:

an arm associated with said base and coupled with a crank for raising and lowering said arm, and a strut coupled with said arm and connected with said cover at two positions spaced from one another such that when said cover is in said closed position, a retention force provided by said strut is distributed about the cover, wherein said strut includes first and second legs fixed relative to each other and a connecting portion extending between said legs, said arm engaging said first leg such that said arm is movable relative to said first leg, wherein said first and second legs are movable relative to the cover, said arm has an overall J shape body with a strut coupling mechanism at one end and a plurality of teeth at the other end.

10. The vent assembly of claim 9, wherein said teeth are coupled with a screw mechanism on said crank for raising and lowering said arm.

11. The vent assembly of claim 9, wherein said strut is a U-shaped strut coupled with a pair of brackets mounted on said cover for raising and lowering said cover.

12. The vent assembly of claim 11, wherein said arm includes a pronged receptacle for receiving said first leg of said U-shaped strut.

13. The vent assembly of claim 11, further comprising a pair of bearing blocks on said base for receiving said connecting portion of said U-shaped strut for positioning said U-shaped strut on said base.

14. The vent assembly of claim 9, wherein said cover has a rectangular configuration with said cover hinged along one side and said two connection positions along two perpendicular sides extend toward a side parallel to the hinged side.

* * * * *